US012639027B2

(12) United States Patent
Du et al.

(10) Patent No.: US 12,639,027 B2
(45) Date of Patent: May 26, 2026

(54) DETERMINING INPUT MODALITY OF HEAD-WORN DEVICE BASED ON INPUT MODALITY OF HANDHELD DEVICE

(71) Applicant: Google LLC, Mountain View, CA (US)

(72) Inventors: Ruofei Du, San Francisco, CA (US); David Kim, Zug (CH); Fengyuan Zhu, Toronto (CA); Daniel Kalmar, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/884,920

(22) Filed: Sep. 13, 2024

(65) Prior Publication Data

US 2025/0094116 A1    Mar. 20, 2025

Related U.S. Application Data

(60) Provisional application No. 63/582,719, filed on Sep. 14, 2023, provisional application No. 63/582,770, filed on Sep. 14, 2023.

(51) Int. Cl.
| | |
|---|---|
| *G06F 3/14* | (2006.01) |
| *G06F 3/01* | (2006.01) |
| *G06F 3/0346* | (2013.01) |
| *G06F 3/04886* | (2022.01) |

(52) U.S. Cl.
CPC ............ *G06F 3/1454* (2013.01); *G06F 3/017* (2013.01); *G06F 3/0346* (2013.01); *G06F 3/04886* (2013.01)

(58) Field of Classification Search
CPC ...... G06F 3/1454; G06F 3/017; G06F 3/0346; G06F 3/04886

USPC .............................................. 345/156–169, 8
See application file for complete search history.

(56) References Cited

U.S. PATENT DOCUMENTS

| | | | | |
|---|---|---|---|---|
| 9,804,696 | B2 * | 10/2017 | Hall ...................... | G06F 3/0346 |
| 2016/0335790 | A1 * | 11/2016 | Fleishman .............. | G06T 7/143 |
| 2017/0336862 | A1 * | 11/2017 | Xu ........................... | G06T 11/60 |
| 2019/0220100 | A1 * | 7/2019 | Kramer ................... | G06F 3/147 |
| 2020/0033944 | A1 * | 1/2020 | Kiemele ............... | G06T 19/006 |
| 2022/0229534 | A1 * | 7/2022 | Terre ................... | G06F 3/04815 |
| 2022/0254120 | A1 * | 8/2022 | Berliner ................. | G06F 3/011 |
| 2023/0116190 | A1 * | 4/2023 | Kies .................... | G06F 3/04815 |
| | | | | 715/236 |
| 2023/0237192 | A1 * | 7/2023 | Kahan .................... | G01C 21/00 |
| | | | | 726/1 |
| 2023/0245396 | A1 * | 8/2023 | Xiong .................... | G06V 10/26 |
| | | | | 345/423 |

OTHER PUBLICATIONS

Brudy, et al., "Cross-Device Taxonomy: Survey, Opportunities and Challenges of Interactions Spanning Across Multiple Devices", ACM CHI 2019, May 2019, 28 pages.

(Continued)

*Primary Examiner* — Kwin Xie
(74) *Attorney, Agent, or Firm* — Brake Hughes Bellermann LLP

(57) ABSTRACT

A method can include determining, by a head-mounted device mounted on a head of a user, a number of degrees of freedom of an input modality of an auxiliary device; determining an input modality of the head-mounted device based on the number of degrees of freedom of the input modality of the auxiliary device; and presenting the input modality of the head-mounted device to the user.

20 Claims, 12 Drawing Sheets

(56)                   References Cited

OTHER PUBLICATIONS

Panda, et al., "Beyond Audio: Towards a Design Space of Headphones as a Site for Interaction and Sensing", DIS '23, Jul. 2023, 13 pages.
Wang, et al., "Screen2Words: Automatic Mobile UI Summarization with Multimodal Learning", UIST '21, Oct. 2021, pp. 498-510.
Zhang, et al., "Screen Recognition: Creating Accessibility Metadata for Mobile Applications from Pixels", CHI '21, Article No. 275, May 2021, 15 pages.
Zhu, et al., "Touching The Droid: Understanding and Improving Touch Precision With Mobile Devices in Virtual Reality", 2022 IEEE International Symposium on Mixed and Augmented Reality (ISMAR), 2022, pp. 807-816.

* cited by examiner

Icon
212

220

214

Icon
202

Code
400

```
<div class="slidecontainer">
        <input type = "range" min = "1" max = "100" value = "50" close = "slider" id = "myRange">
</div>
```

Computing
Device
600

Interface Generator
602

Input Monitor
612

Degree of Freedom
Determiner
604

Adjustment
Determiner
614

Code Generator
606

Processor
616

Language Model
608

Memory
618

Input Modality
Determiner
610

Input/output
620

800

Determine number of degrees of freedom
802

Determine input modality
804

Present input modality
806

900

Generate virtual display
902

Generate virtual hand
904

Present virtual hand contacting virtual display
906

Determine time or location of contact
908

Determine adjustment
910

Present virtual hand contacting virtual display based on adjustment
912

DETERMINING INPUT MODALITY OF HEAD-WORN DEVICE BASED ON INPUT MODALITY OF HANDHELD DEVICE

CROSS-REFERENCE TO RELATED APPLICATIONS

This Application claims the benefit of priority based on U.S. Provisional Patent Application No. 63/582,770, filed on Sep. 14, 2023, and U.S. Provisional Patent Application No. 63/582,719, filed on Sep. 14, 2023, the disclosures of which are incorporated herein by reference in their entirety.

BACKGROUND

Head-mounted devices can present images to a user to generate an immersive, extended reality (XR) environment. Handheld devices, such as mobile phones or smartphones, can present a display that also receives input from a user. A user can interact with a handheld device at a same time that the user is experiencing the XR environment.

SUMMARY

A system, which can include a head-mounted device, can map an input modality of a two-dimensional user interface of an auxiliary device such as a mobile phone to an input modality of the head-mounted device within an extended reality (XR) environment generated by the head-mounted device. The system can determine a number of degrees of freedom of the input modality of the auxiliary device. Based on the number of degrees of freedom, the system can determine an input modality of the head-mounted device. The system can present the input modality of the head-mounted device to a user of the auxiliary device and the head-mounted device within the XR environment. The system can thereby facilitate the user interacting with the auxiliary device within the XR environment.

According to an example, a method can include determining, by a head-mounted device mounted on a head of a user, a number of degrees of freedom of an input modality of an auxiliary device; determining an input modality of the head-mounted device based on the number of degrees of freedom of the input modality of the auxiliary device; and presenting the input modality of the head-mounted device to the user.

According to an example, a non-transitory computer-readable storage medium comprising instructions stored thereon. When executed by at least one processor, the instructions are configured to cause a computing device to determine, by a head-mounted device mounted on a head of a user, a number of degrees of freedom of an input modality of an auxiliary device held by a hand of the user; determine an input modality of the head-mounted device based on the number of degrees of freedom of the input modality of the auxiliary device; and present the input modality of the head-mounted device to the user.

According to an example, a method includes generating, by a head-mounted device within an extended Reality (XR) environment, a virtual display, the virtual display being based on a touchscreen display presented by an auxiliary device held by a user who is wearing the head-mounted device; generating, within the XR environment, a virtual hand based on first image data captured by a camera, the camera being included in the head-mounted device; presenting, within the XR environment, the virtual hand contacting the virtual display based on second image data captured by the camera; determining at least one of a time or location of contact by a hand of the user onto the touchscreen display based on a signal received from the auxiliary device; determining an adjustment based on the at least one of the time or location of the contact and the presentation of the virtual hand contacting the virtual display; and presenting, within the XR environment, the virtual hand contacting the virtual display based on third image data captured by the camera and the adjustment.

The details of one or more implementations are set forth in the accompanying drawings and the description below. Other features will be apparent from the description and drawings, and from the claims.

BRIEF DESCRIPTION OF THE DRAWINGS

Like reference numbers refer to like elements.

DETAILED DESCRIPTION

A user can interact with elements of an extended reality (XR) environment generated by a head-mounted device worn by the user while interacting with an auxiliary device such as a handheld device including a smartphone. Interacting with the handheld device can have the benefit of being able to interact with applications that are already installed on the handheld device but not the head-mounted device, and/or that the user interfaces (or input modalities) of the handheld device may be more familiar to the user than user interfaces (or input modalities) of the head-mounted device. However, a technical problem with receiving input via the handheld device within the XR environment is that presenting an input interface of the handheld device within the XR environment can be difficult. For example, the head-mounted device may have difficulty generating an image that reproduces a display included in the handheld device due to passthrough camera resolution, overexposure, display flicker, camera focus, pixel density within the XR environment, and/or passthrough reprojection that are not ideal. The image may be too small for the user, or processing input of the user into a touchscreen included in the handheld device may be inaccurate. Receiving input from the user directly through the input modality of the handheld device may therefore not be feasible.

A technical solution to this technical problem is to map an input modality of the auxiliary device such as a handheld device to an input modality of the head-mounted device. A system, which can include the head-mounted device and/or a computing system in communication with the head-mounted device, can map the input modality of the auxiliary device to an input modality of the head-mounted device. An input modality can be a user interface and/or means of receiving input from the user, such as via touch contact on a touchscreen display or gaze input that tracks a direction of focus of a gaze of the user. Mapping the input modality of the auxiliary device to the input modality of the head-mounted device can include determining a number of degrees of freedom of the input modality of the auxiliary device, and determining the input modality of the auxiliary device based on the number of degrees of freedom. The system can present the determined input modality of the head-mounted device to the user within the XR environment. A technical benefit of the technical solution of mapping the input modality of the auxiliary device to the input modality of the head-mounted device is presenting an input modality via which the system can accurately receive and/or process input from the user within the XR environment and provide the input to the handheld device.

Figure 1:
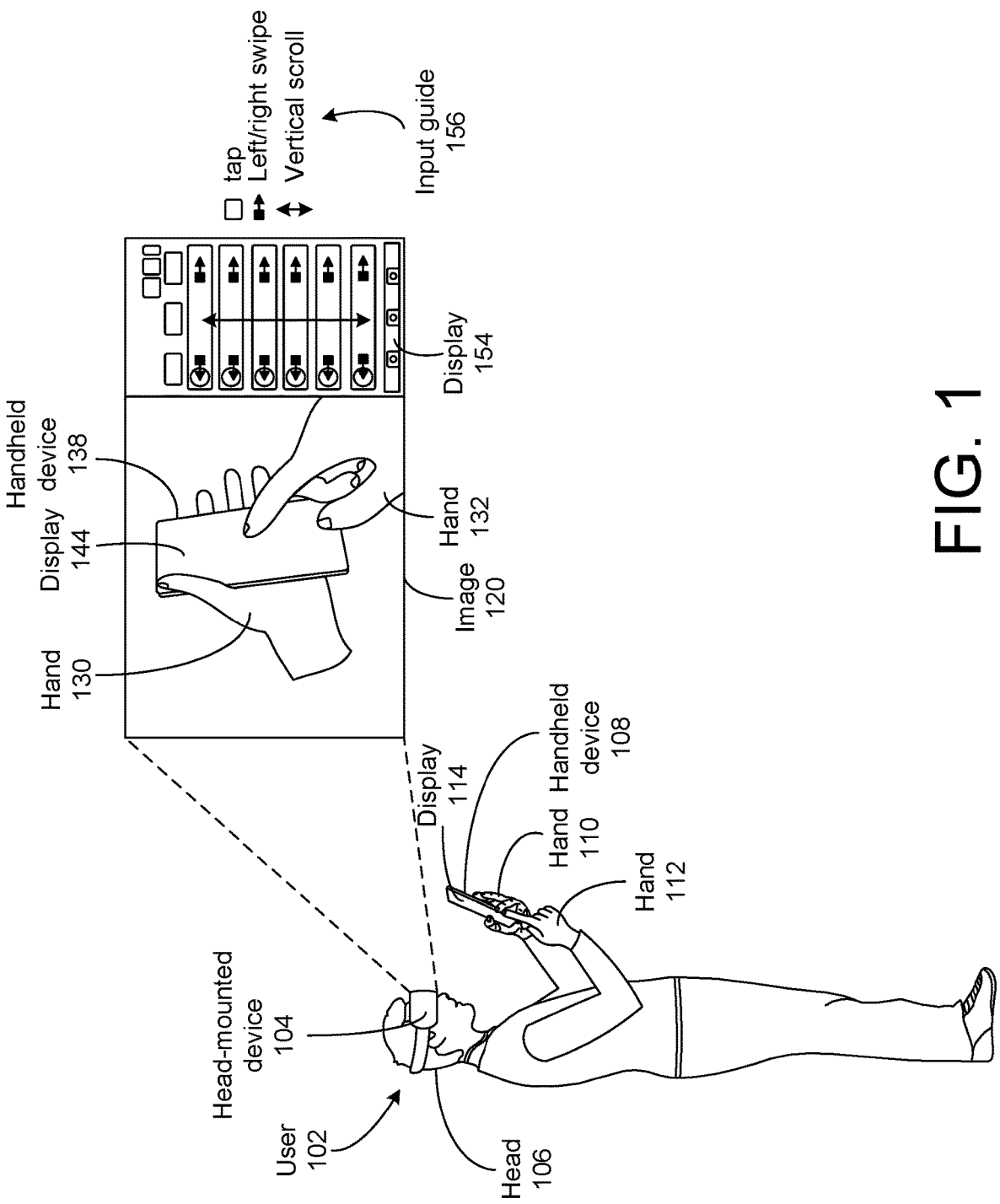
FIG. 1 shows a user interacting with a handheld device and a head-mounted device presenting a representation of the handheld device.

FIG. 1 shows a user 102 interacting with a handheld device 108 and a head-mounted device 104 presenting a representation of the handheld device 108. The handheld device 108 is an example of an auxiliary device. Other examples of auxiliary devices include human interface devices (HIDs) that a user can provide input to with a hand of the user such as a keyboard or computer mouse. In this example, the user 102 is wearing the head-mounted device 104 mounted on a head 106 of the user 102. The head-mounted device 104 includes a display in front of eyes of the user 102. The display of the head-mounted device 104 presents one or more images to the user 102. The images presented by the display of the head-mounted device 104 can replace, augment, and/or supplement a view of the physical environment for the user 102. The images presented by the display of the head-mounted device 104 can generate and/or constitute an extended reality (XR) environment for the user 102. In some examples, the head-mounted device 104 recreates the physical environment based on images captured by one or more cameras included in the head-mounted device 104. Recreating the physical environment enables the user 102 to freely move around the physical environment and perform everyday tasks such as retrieving a beverage without removing the head-mounted device 104. The head-mounted device 104 can include an XR headset or smartglasses, as non-limiting examples.

In some examples, the handheld device 108 is held by a hand 110 of the user 102. In some examples, the auxiliary device, of which the handheld device 108 is an example, receives input via a hand of a user and transmits the input to another computing device, such as a desktop computer, a laptop computer, a tablet computer, or s smartphone or mobile device. In the example shown in FIG. 1, the user 102 is holding the handheld device 108 with a left hand 110 of the user 102 and is interacting with the handheld device 108 with a right hand 112 of the user 102. In some examples, the user 102 interacts with a touchscreen display 114 of the handheld device 108. The user 102 can interact with the touchscreen display 114 by contacting the touchscreen display 114 and thereby providing input to the touchscreen display 114 via one or more of multiple input modalities of the handheld device 108. In some examples, the input modalities include selecting an icon by touching or tapping a portion of the touchscreen display 114 that displays the icon. In some examples, the input modalities include swiping on a portion of the touchscreen display 114. In some examples, the input modalities include a pinch in gesture in which two fingers of the right hand 112 slide along the touchscreen display 114 toward each other and/or a pinch out gesture in which two fingers of the right hand 112 slide along the touchscreen display 114 away from each other. In some examples, the input modalities include typing on multiple keys representing alphanumeric characters presented by the touchscreen display 114.

The images presented by the display of the head-mounted device 104 can include an image 120 shown in FIG. 1. In the example shown in FIG. 1, the image 120 includes a hand image 130 representing the left hand 110 that is holding the handheld device 108, a handheld device image 138 representing the handheld device 108, a display image 144 representing the touchscreen display 114, and a hand image 132 representing the right hand 112. The display image 144 can be considered a virtual display. The hand image 132 can also be considered a virtual hand. In some examples, the head-mounted device 104 presents the handheld device image 138 based on a location of the handheld device 108 that the head-mounted device 104 determined based on images captured by one or more cameras included in the head-mounted device 104 as well as motion data. The motion data may have been measured by an inertial measurement unit (IMU) included in the handheld device 108 and received by the head-mounted device 104 from the handheld device 108, enabling the head-mounted device 104 to perform six degree of freedom (6DoF) tracking of the handheld device 108. The images captured by the one or more cameras included in the head-mounted device 104 can be considered image data. The head-mounted device 104 can perform object detection (such as machine learning based object detection), augmented reality core-based phone tracking, and/or headset-based object tracking of the handheld device 108. The size and/or angle of the display image 144 presented by the head-mounted device 104 can make viewing the display image 144 difficult for the user 102 to interpret, understand, and/or interact with in the XR environment.

To improve the ease with which the user 102 can interact with the touchscreen display 114 in the XR environment, the head-mounted device 104 can generate and/or present a display 154 to the user 102. The display 154 can include elements, such as user interface elements, corresponding to elements presented by the touchscreen display 114. The elements included in the display 154 can include, for example, informative content based on informative content presented by the touchscreen display 114. In some examples, the head-mounted device 104 uplevels two-dimensional content from the touchscreen display 114 to three-dimensional content on the display 154 and/or within the image 120. The elements included in the display 154 can, for example, include one or more input modalities of the head-mounted device 104. The input modalities of the head-mounted device 104 included in the display 154 can correspond to input modalities of the handheld device 108. In some examples, the image 120 includes an input guide 156 that identifies and/or describes input modalities of the head-mounted device 104. The input guide 156 shows that the input modalities of the head-mounted device 104 within the display 154 include tapping, left or right swipes, or vertical scrolling.

The head-mounted device 104, and/or a computing system in communication with the head-mounted device 104, can determine and/or generate the input modalities of the head-mounted device 104 based on a number of degrees of freedom of the corresponding input modalities of the handheld device 108. In some examples, the number of degrees of freedom is zero for a selection of an icon, such as a tap or click of the icon, on the touchscreen display 114. In some examples, the number of degrees of freedom is two for a swipe gesture along the touchscreen display 114. In some examples, the number of degrees of freedom is two for a pinch in gesture or pinch out gesture with two fingers along the touchscreen display 114. In some examples, the number of degrees of freedom is two for typing into a physical keyboard or providing input into a computer mouse (such as moving the mouse and/or activating buttons on the mouse). In some examples, the number of degrees of freedom is two for selections of multiple icons, such as alphanumeric keys, that are arranged on the touchscreen display 114 in two dimensions and/or are not arranged along a line.

The head-mounted device 104 can determine the number of degrees of freedom of each of the input modalities of the head-mounted device 104. In some examples, the head-mounted device 104 determines the number of degrees of freedom of each of the input modalities of the head-mounted device 104 based one or more images of the touchscreen display 114 captured by one or more cameras included in the head-mounted device 104. In some examples, the head-mounted device 104 generates computer-executable code, such as Hypertext Markup Language (HTML) code, based on the images of the touchscreen display 114. The code would implement the input modalities of the handheld device 108. In an example, if an input modality of the handheld device 108 is selection of an icon, then the code implements receiving input via selection of an icon. In an example, if the input modality of the handheld device 108 is a swipe gesture, then the code implements receiving input via a swipe gesture. In an example, if the input modality of the handheld device 108 is a pinch in gesture and/or pinch out gesture, then the code implements receiving input via a pinch in gesture and/or a pinch out gesture. In an example, if the input modality of the handheld device 108 is receiving selections of multiple icons such as a soft keyboard, then the code implements receiving input via selections of multiple icons such as a soft keyboard.

The head-mounted device 104 can generate and/or determine the input modality of the head-mounted device 104 based on the number of degrees of freedom of the input modality of the handheld device 108. In some examples, the head-mounted device 104 can generate and/or determine the input modality of the head-mounted device 104 based on the code generated by the head-mounted device 104, the code being generated based on the images of the touchscreen display 114.

FIGS. 2A through 2D show input modalities of the handheld device 108 and corresponding input modalities of the head-mounted device 104. The head-mounted device 104 may have generated the corresponding input modalities of the head-mounted device 104 based on images of the touchscreen display 114 and/or images of the input modalities of the touchscreen display 114. In FIGS. 2A through 2D, display 214 is a portion of the touchscreen display 114 of the handheld device 108, and display 220 is part of one or more images presented and/or generated by the head-mounted device 104 within the XR environment.

Figure 2A:
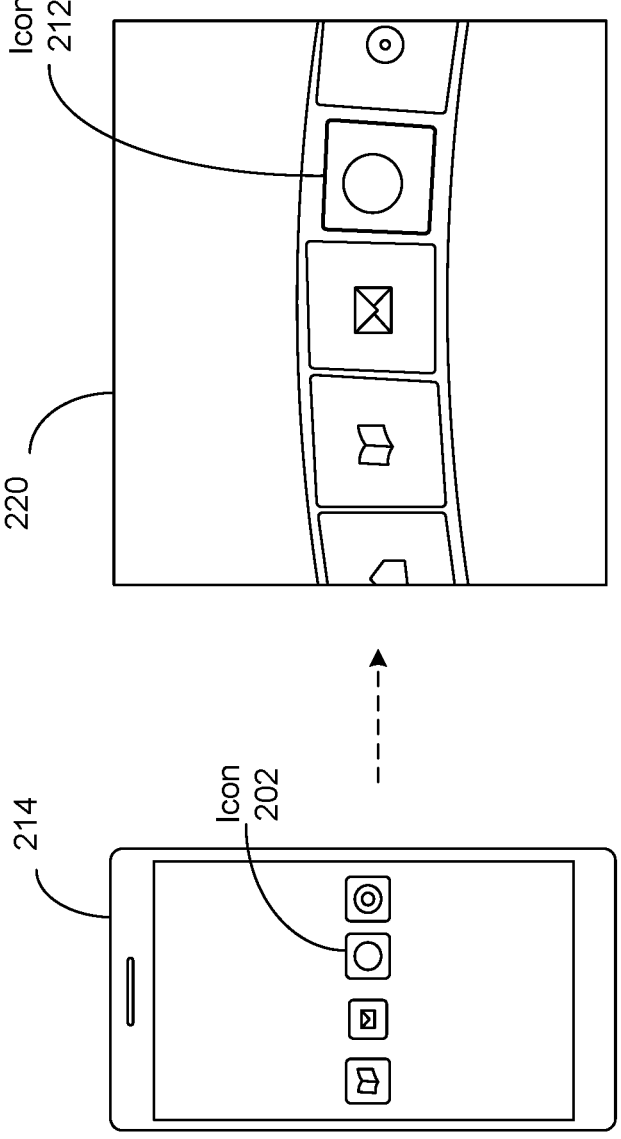
FIG. 2A shows the handheld device presenting an icon as an input modality and the head-mounted device presenting an icon as an input modality.

FIG. 2A shows the handheld device 108 presenting an icon 202 as an input modality and the head-mounted device 104 presenting an icon 212 as an input modality. The icon 202 can represent a button, text or image link, toggle, checkbox, or menu, that can be selected by the user 102 by input such as touch, tapping, and/or clicking on a portion of the display 214 corresponding to and/or associated with the icon 202. The computing system (which can include the head-mounted device 104) can determine that the input modality of the icon 202 has zero degrees of freedom. The computing system can determine that the input modality of the icon 202 is binary and has zero degrees of freedom based on one or more images of the touchscreen display 114 that were captured by one or more cameras included in the head-mounted device 104.

Based on determining that the input modality of the icon 202 has zero degrees of freedom, the computing system can determine that the icon 212 generated and/or presented by the head-mounted device 104 should be the input modality of the head-mounted device 104 corresponding to the input modality of the handheld device 108. The input modality of the icon 212 can include the user 102 selecting the icon 212. In some examples, the user 102 can select the icon 212 by gaze input, such as by the head-mounted device 104 determining, based on one or more images captured by one or more gaze-tracking cameras included in the head-mounted device 104, that the user 102 has looked at the icon 212. In some examples, the user 102 can select the icon 212 by a gesture, such as by moving a finger or other portion of a hand 110, 112 of the user 102 to a location within the XR environment corresponding to the icon 212.

Figure 2B:
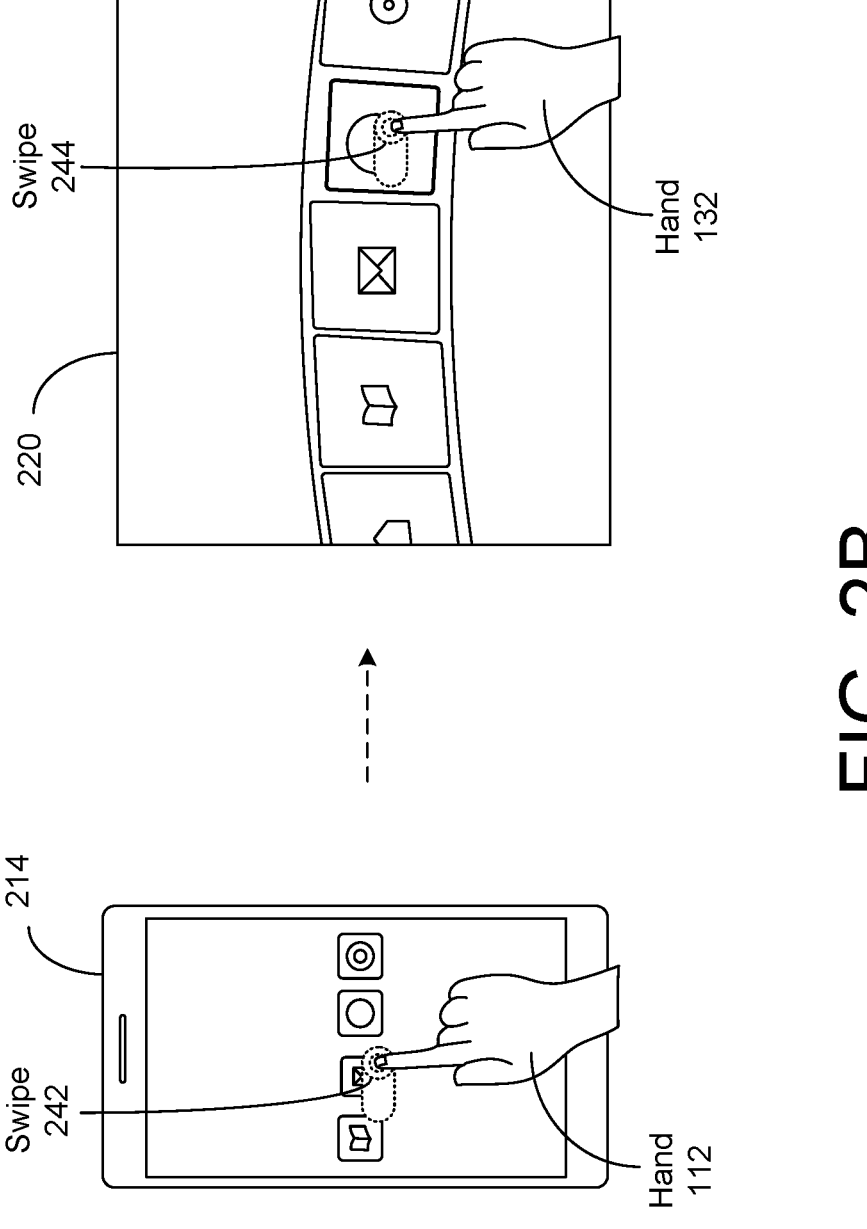
FIG. 2B shows the handheld device processing a swipe as an input modality and the head-mounted device processing a swipe as an input modality.

FIG. 2B shows the handheld device 108 processing a swipe 242 as an input modality and the head-mounted device 104 processing a swipe 244 as an input modality. The handheld device 108 can process the swipe 242 as an input modality by detecting and/or determining that a finger included in the right hand 112 of the user 102 is moving across the display 214 in a linear direction (i.e. in a single direction and/or along a straight line such as horizontal or vertical). The computing system can determine that the input modality of the handheld device 108, the swipe 242, has one degree of freedom. The computing system can determine that the input modality of the swipe 242 has one degree of freedom based on one or more images of the touchscreen display 114 captured by one or more cameras included in the head-mounted device 104.

Based on determining that the input modality of the swipe 242 has one degree of freedom, the computing system can determine that the swipe 244 recognized and/or processed by the head-mounted device 104 should be the input modality of the head-mounted device 104 corresponding to the input modality of the handheld device 108. The input modality of the swipe 244 can include the user 102 making a motion in the air with a finger and/or right hand 112 in a straight line. One or more cameras included in the head-mounted device 104 can capture one or more images of the user 102 making the motion in the air. The computing system can recognize the swipe 244 based on the one or more images of the user 102 making the motion in the air.

Figure 2C:
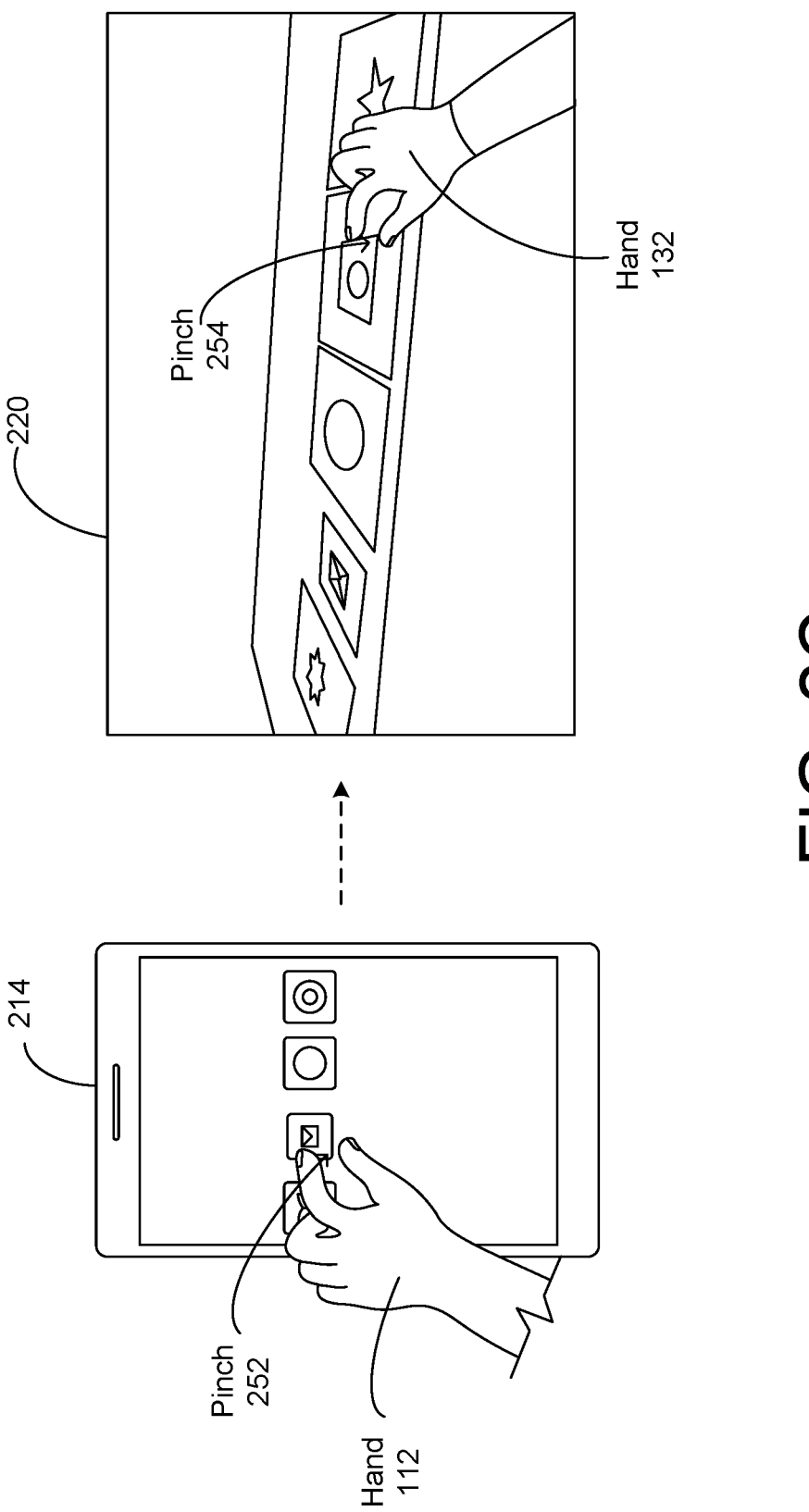
FIG. 2C shows the handheld device processing a pinch as an input modality and the head-mounted device processing a pinch as an input modality.

FIG. 2C shows the handheld device 108 processing a pinch 252 as an input modality and the head-mounted device 104 processing a pinch 254 as an input modality. The handheld device 108 can process the pinch 252 as an input modality by detecting and/or determining that two fingers (such as a thumb and forefinger) included in the right hand 112 of the user 102 are moving across the display 214 toward or away from each other. The computing system can determine that the input modality of the handheld device 108, the pinch 252, has two degrees of freedom. The computing system can determine that the input modality of the pinch 252 has two degrees of freedom based on one or more images of the touchscreen display 114 captured by one or more cameras included in the head-mounted device 104.

Based on determining that the input modality of the pinch 252 has two degrees of freedom, the computing system can determine that the pinch 254 recognized and/or processed by the head-mounted device 104 should be the input modality of the head-mounted device 104 corresponding to the input modality of the handheld device 108. The input modality of the pinch 254 can include the user 102 making a pinching gesture in the air with two fingers. One or more cameras included in the head-mounted device 104 can capture one or more images of the user 102 making the pinching gesture in the air. The computing system can recognize the pinch 254 based on the one or more images of the user 102 making the pinching gesture in the air.

Figure 2D:
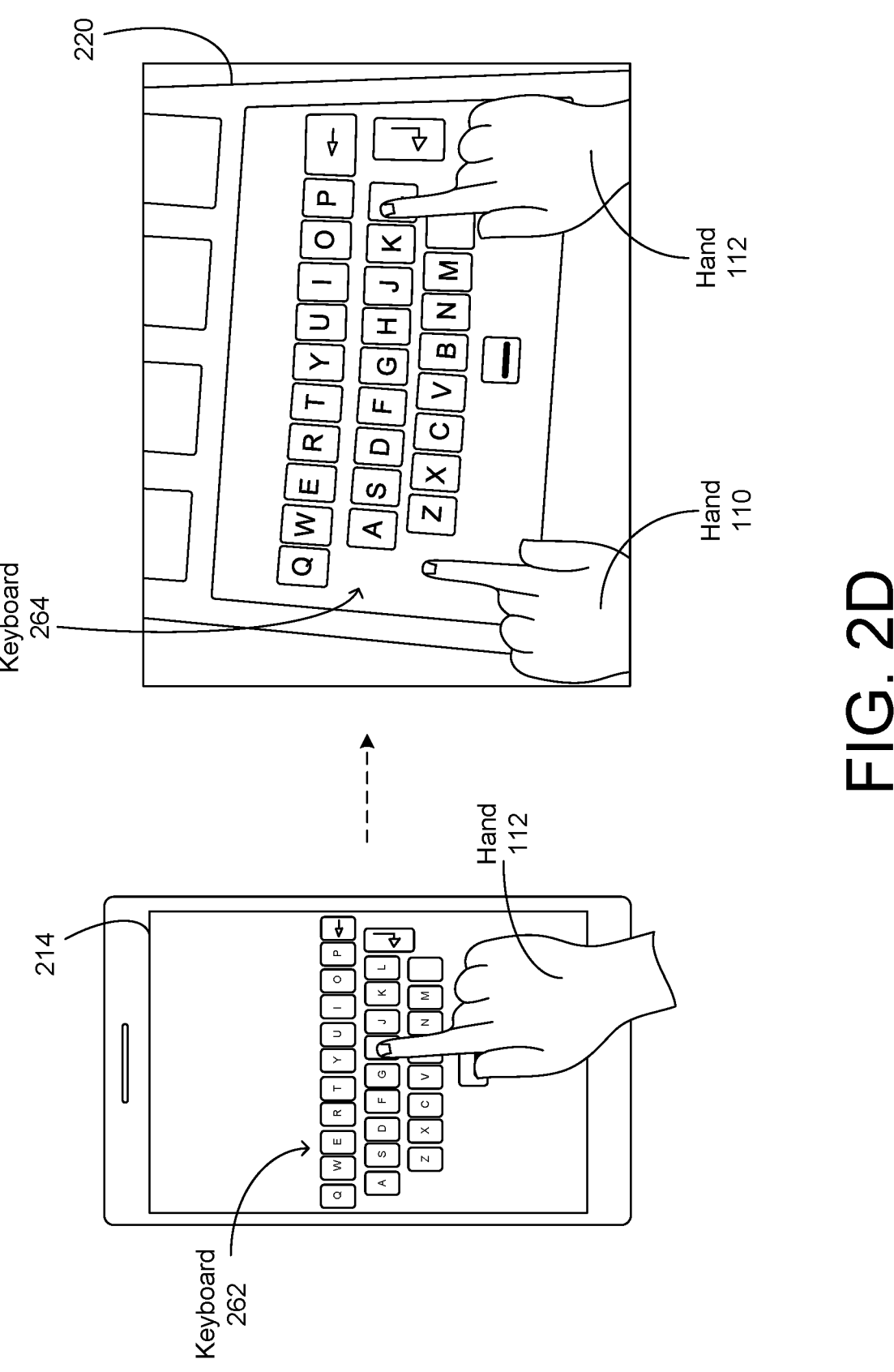
FIG. 2D shows the handheld device presenting a soft keyboard and the head-mounted device presenting a virtual keyboard.

FIG. 2D shows the handheld device 108 presenting a soft keyboard 262 and the head-mounted device 104 presenting a virtual keyboard 264. The handheld device 108 presents the soft keyboard 262 by the display 214 presenting multiple icons that represent alphanumeric keys. The handheld device 108 can process and/or recognize alphanumeric input based on contact with portions of the display 214 that present the icons corresponding to alphanumeric keys. The icons in the soft keyboard 262 can be arranged in two dimensions, i.e. not along a straight line. The computing system can determine that the input modality of the handheld device 108, the soft keyboard 262, has two degrees of freedom. The computing system can determine that the input modality of the soft keyboard 262 has two degrees of freedom based on one or more images of the touchscreen display 114 captured by one or more cameras included in the head-mounted device 104.

Based on determining that the input modality of the soft keyboard 262 has two degrees of freedom, the computing system can determine that the virtual keyboard 264 recognized and/or processed by the head-mounted device 104 should be the input modality of the head-mounted device 104 corresponding to the input modality of the handheld device 108. The computing system can determine that the virtual keyboard 264 should be the input modality of the head-mounted device 104, rather than the pinch 254 which also corresponds to an input modality of the handheld device 108 that has two degrees of freedom, based on the images of the input modality of the handheld device 108. The computing system can select an input modality of the head-mounted device 104 from a set of input modalities that correspond to a given number of degrees of freedom. The computing system can select an input modality of the head-mounted device 104 from a set of input modalities that correspond to a given number of degrees of freedom by selecting an input modality of the head-mounted device 104 that is most similar to the input modality of the handheld device 108. The head-mounted device 104 can present the virtual keyboard 264 within locations in front of the user within the XR environment. The head-mounted device 104 can recognize selections of icons and/or keys within the virtual keyboard 264 based on fingers and/or hands 110, 112 of the user contacting locations in space where the icons and/or keys are presented to the user 102 as being located.

Figure 3:
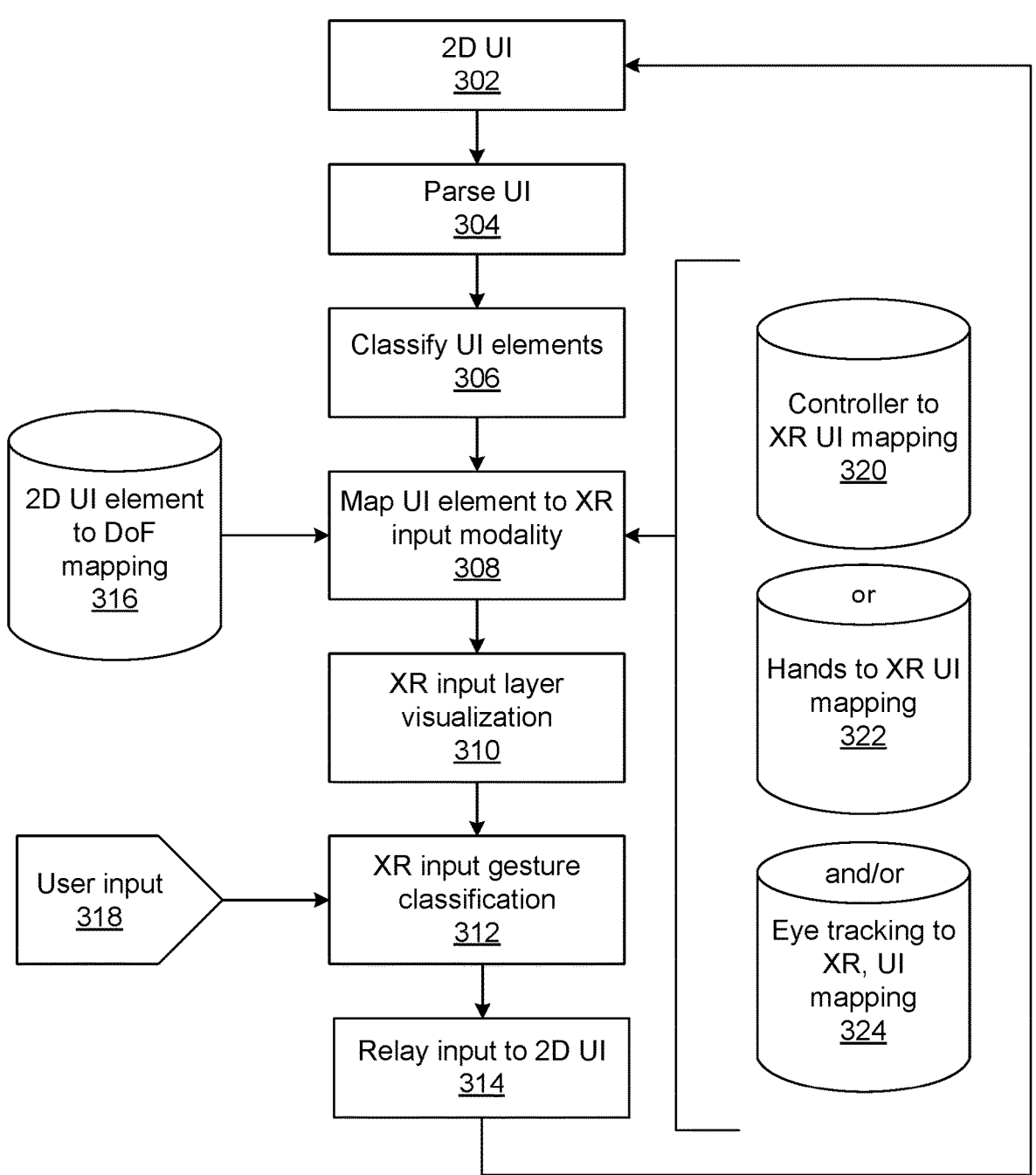
FIG. 3 shows a flowchart of a method for generating an input modality for the head-mounted device based on an input modality of the handheld device.

FIG. 3 shows a flowchart of a method for generating an input modality for the head-mounted device 104 based on an input modality of the handheld device 108. The method can be performed by the head-mounted device 104, a computing system in communication with the head-mounted device 104, or distributed between the head-mounted device 104, the computing system in communication with the head-mounted device 104, and/or any other computing devices such as the handheld device 108, as non-limiting examples.

The method begins by capturing an image of a two-dimensional user interface (302). The capturing of the image of the two-dimensional user interface (302) can be performed by a camera included in the head-mounted device 104 capturing an image of the touchscreen display 114. The touchscreen display 114 can represent the two-dimensional user interface with colored pixels. The image of the two-dimensional user interface that is captured can include one or more input modalities of the handheld device 108, such as an icon, swipe gesture, pinch in or pinch out gesture, or keyboard, as non-limiting examples.

The method includes parsing the user interface (304). When the user interface includes user interface elements and/or widgets implemented by an operating system executing on the handheld device 108, such as an operating system-level element or widget, parsing the user interface (304) can include extracting the elements and/or widgets implemented by the operating system. In some examples, elements and/or widgets implemented by the operating system can be mapped to predetermined classifications at (308). In some examples, parsing the user interface (304) includes detection of user interface elements, such as machine learning-based detection of user interface elements, and classification of the interaction mechanisms and/or gestures of the user interface elements.

Figure 4:
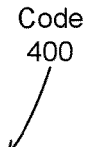
FIG. 4 shows code generated to represent an input modality of the handheld device.

Parsing the user interface (304) can include generating computer-executable code that, when executed by at least one processor, would cause a computing system to implement the input modalities of the handheld device 108 included in the image of the two-dimensional user interface that was captured at (302). The computer-executable code can be generated based on the image of the two-dimensional user interface that was captured at (302). In some examples, parsing the user interface (304) to generate the computer-executable code can include requesting a visual language model to generate the computer-executable code based on the image of the two-dimensional user interface. An example of computer executable code generated based on the image of the two-dimensional interface is shown in FIG. 4.

The method includes classifying user interface elements (306). Classifying the user interface elements (306) can include determining classifications for the user interface elements that were parsed at (304). The user interface elements can be classified by models, such as language models and/or vision machine learning engines. The user interface elements can be classified as binary selection which would map to zero degrees of freedom and may be selected by gaze and pinch or pinch only (such as a button, text or image link, toggle, checkbox, menu, or dropdown menu), discrete navigation between user interface elements which would map to one degree of freedom in a horizontal or vertical direction or two degrees of freedom in both the horizontal and vertical directions (such as buttons and links across the user interface, a menu, or a dropdown menu), pinching or gestures which would map to two degrees of freedom (such as zooming in or zooming out), swiping which would map to one degree of freedom with left/right swipes or up/down swipes (such as edge swipes in a phot gallery), continuous scrolling elements that would map to one degree of freedom (including vertical scrolling, horizontal scrolling, or panning which includes both horizontal and vertical scrolling and would map to two degrees of freedom), dragging elements which would map to one degree of freedom (including vertical dragging which can include reordering items in a list, horizontal dragging, or horizontal and vertical dragging which would map to two degrees of freedom), rotational dragging which would map to two degrees of freedom (such as dragging a circular user interface), operating system-level gestures which can directly map to predetermined input modalities of the head-mounted device 104 (such as invoking notifications, invoking quick system settings, returning to a home screen, switching between applications, or invoking a multitasking view), single taps which can map to a single degree of freedom, double taps which can map to a single degree of freedom, scaled raw input which can map to a single degree of freedom (such as decoupling input from output and scaling up input motion), and/or upscaling raw input which can map to a single degree of freedom (such as one-to-one mapping between input and output), as non-limiting examples.

The method includes mapping the user interface element to an XR input modality (308). The mapping of the user interface element to the XR input modality (308) can include mapping the input modality of the handheld device 108 to an input modality of the head-mounted device 104. In some examples, the mapping of the user interface element to the XR input modality (308) includes performing a mapping and/or optimization function to arrive at the XR input modality. The mapping and/or optimization function can include, for example, a decision tree classifier or a transformer.

Mapping the user interface element to the XR input modality (308) can include accessing a two-dimensional element to degree-of-freedom mapping database 316. The two-dimensional element to a degree-of-freedom mapping database 316 can include a map of two-dimensional user interface elements (which can also be considered input modalities of the handheld device 108) to numbers of degrees of freedom. The mapping of the user interface element to the XR input modality (308) can include retrieving, from the two-dimensional element to degree-of-freedom mapping database 316, the number of degrees of freedom of the UI element and/or input modality of the handheld device 108 based on the UI element and/or input modality of the handheld device 108.

Mapping the user interface element to the XR input modality (308) can include accessing one or more of a controller to XR user interface mapping database 320, a hands to XR user interface mapping database 322, and/or an eye tracking to XR user interface mapping database. These databases 320, 322, 324 can map any of input from a controller, input from hands 110, 112 of the user 102, or eyes of the user 102, respectively, to a user interface within the XR environment. The user interface within the XR environment can include the input modality of the head-mounted device 104. The mapping of the user interface element to the XR input modality (308) can include retrieving, from one or more of the databases 320, 322, 324, an XR user interface and/or input modality of the head-mounted device 104 based on at least one of controller input, hand input, and/or eye tracking input.

The method can include XR input layer visualization (310). XR input layer visualization (310) can include the head-mounted device 104 determining locations and visual representations of input modalities of the head-mounted device 104. The head-mounted device 104 can determine, for example, how and where to represent and/or display a button, a surface onto which a swipe or pinch gesture can be made, and/or a virtual keyboard can be placed, as non-limiting examples.

The method can include XR input gesture classification (312). XR input gesture classification (312) can include receiving user input 318 to the input modality of the head-mounted device 104. The user input 318 to the input modality of the head-mounted device 104 can include, for example, a gaze of an eye of the user 102, a tap of a finger or other portion of a hand 110, 112 of the user 102, a swipe of a finger or other portion of a hand 110, 112 of the user 102, or typing by fingers or other portions of the hand 110, 112 of the user 102, as non-limiting examples. The input gesture classification (312) can include classifying and/or determining a gesture based on the user input 318. The gesture can be classified as a selection of an icon, a swipe, a pinch, or typing into alphanumeric keys, as non-limiting examples.

The method can include relaying the input to the two-dimensional user interface (314). Relaying the input to the two-dimensional user interface (314) can include sending the input classified at (312) to the user interface of the handheld device 108. In some examples, the input is relayed to the two-dimensional user interface (314) via a wireless channel between the head-mounted device 104 and the handheld device 108. In examples in which the user 102 is logged into both the handheld device 108 and the head-mounted device 104 via a same account (such as logged into a remote server via both the head-mounted device 104 and the handheld device 108), the input can be relayed to the two-dimensional user interface (314) via the remote server that both the head-mounted device 104 and the handheld device 108 are logged into. Sending the classified input to the user interface of the handheld device 108 enables the handheld device 108 to respond to the classified input by processing the input as if the input had been received by the handheld device 108 directly from the user 102. The handheld device 108 can thereafter respond to the input, such as responding to selection of an icon, swiping, pinching, or typing into alphanumeric keys, as non-limiting examples.

FIG. 4 shows code 400 generated to represent an input modality of the handheld device 108. In this example, the code 400 is Hypertext Markup Language (HTML) code. However, the code 400 can be generated in other programming languages that are executable by computers. The code 400 was generated by the computing system based on one or more images of the input modality of the handheld device 108. In this example, the images showed a slider for receiving sliding or swiping input, and the code 400 generates a slider for receiving sliding or swiping input.

Figure 5:
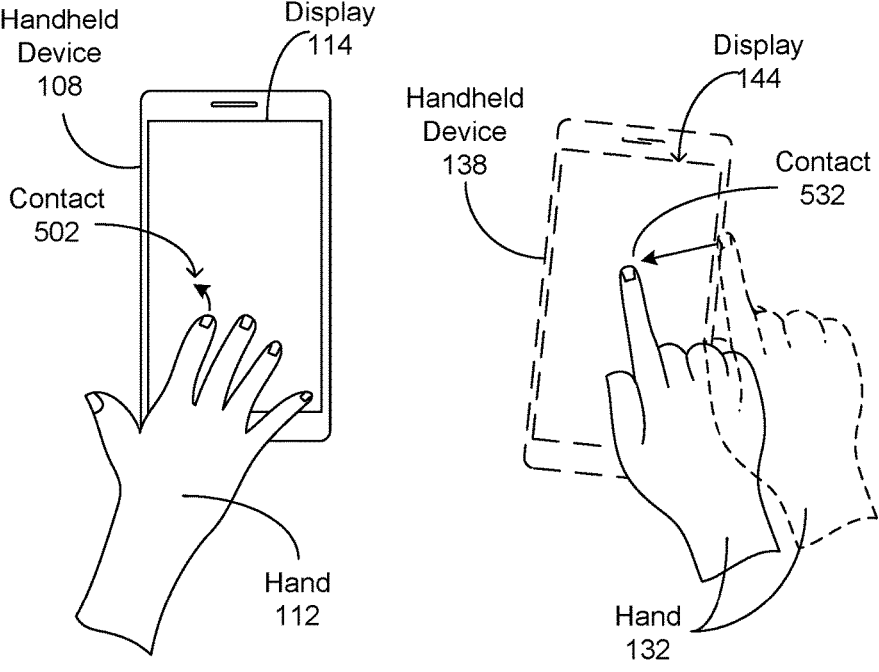
FIG. 5 shows the handheld device processing contact by a hand and the head-mounted device presenting contact by a hand image.

FIG. 5 shows the handheld device 108 processing contact 502 by a hand 112 and the head-mounted device 104 (not shown in FIG. 5) presenting contact 532 by a hand image 132. The head-mounted device 104 can present an image of the handheld device 108, as a handheld device image 138, based on a captured image of the handheld device 108. The head-mounted device 104 can stream and/or mirror content 502 of the touchscreen display 114 of the handheld device 108 into contact 532 of the display image 144 of the handheld device image 138. The content of the handheld device 108 can be screencast to the head-mounted device 104. In some examples, the content presented by the touchscreen display 114 is screencast as a texture on an arbitrary three-dimensional object in the XR environment, increasing legibility and/or ease of interaction. The head-mounted device 104 can present an image of the right hand 112, as a hand image 132, based on a captured image of the right hand 112. While the hand 112 is referred to herein as a right hand, the hand 112 could be either hand or any portion of the body for which the handheld device 108 recognizes contact 502. In some examples, the head-mounted device 104 determines locations of joints of the right hand 112 based on the captured image of the right hand 112. The head-mounted device 104 streams content of the handheld device 108 onto a larger, virtual version of the display of the handheld device 108.

The user 102 can contact 502 the handheld device 108 with a portion of the right hand 112 such as an index finger of the right hand 112. The head-mounted device 104 can display, to the user 102, a contact 532 of the handheld device image 138 by the hand image 132 corresponding to the contact 502 of the handheld device 108 by the portion of the right hand 112. In some examples, the head-mounted device 104 displays the contact 532 while mirroring or presenting an application (such as a web browser) executing on the handheld device 108, enabling the user 102 to use hands 110, 112 of the user 102 to directly interact with the handheld device 108 with the re-rendered display image 144 on top of the handheld device image 138 within the XR environment, enabling the user 102 to interact with the touchscreen display 114 as well as input modalities such as a soft keyboard presented on the touchscreen display 114. However, errors in capturing images of the handheld device 108 and hand right hand 112 and generating the corresponding handheld device image 138 and hand image 132 can cause the timing and/or location of the presented contact 532 to be misaligned with the actual contact 502 of the handheld device 108 by the right hand 112. This misalignment can be annoying for the user 102, and/or can cause errors in the location on the handheld device 108 at which the right hand 112 contacts the handheld device 108 that result in inaccurate input. To reduce the misalignment, tracking between presenting contact 532 and the contact 502 can indicate discrepancies between the times and locations of the handheld device image 138 and the handheld device 108, as well as between the hand image 132 and the right hand 112. The computing system can thereby improve the presentation of the handheld device image 138 and the hand image 132 based on input received by the head-mounted device 104 from the handheld device 108 indicating the timing and/or location of the contact of the right hand 112 on the handheld device 108.

The computing system can determine a time and/or location of contact 502 of the right hand 112 on the handheld device 108. The computing system can determine the time and/or location of the contact 502 of the right hand 112 on the handheld device 108 based on a signal and/or data received from the handheld device 108, such as timing and/or location signals and/or data received via a wireless channel between the handheld device 108 and the head-mounted device 104. The computing system can compare the time and/or location of the contact 502 of the right hand 112 on the handheld device 108 to the time and/or location of the contact 532 of the hand image 132 on the handheld device image 138 that is presented to the user 102 by the head-mounted device 104. The contact 532 of the hand image 132 on the handheld device image 138 is based on images of the right hand 112 and handheld device 108 captured by the head-mounted device 104. Based on a difference and/or discrepancy of time and/or location between the presented contact 532 and contact 502, the computing system can determine an adjustment of at least one of the time or location of contact. The computing system can thereafter determine an adjusted time and/or location of contact 532 by the hand image 132 on the handheld device image 138 based on the determined adjustment and one or more images of the right hand 112 and handheld device 108 captured by one or more cameras included in the head-mounted device 104. The head-mounted device 104 can present the hand image 132 and handheld device image 138 to the user 102 based on the adjusted time and/or location of the contact.

Figure 6:
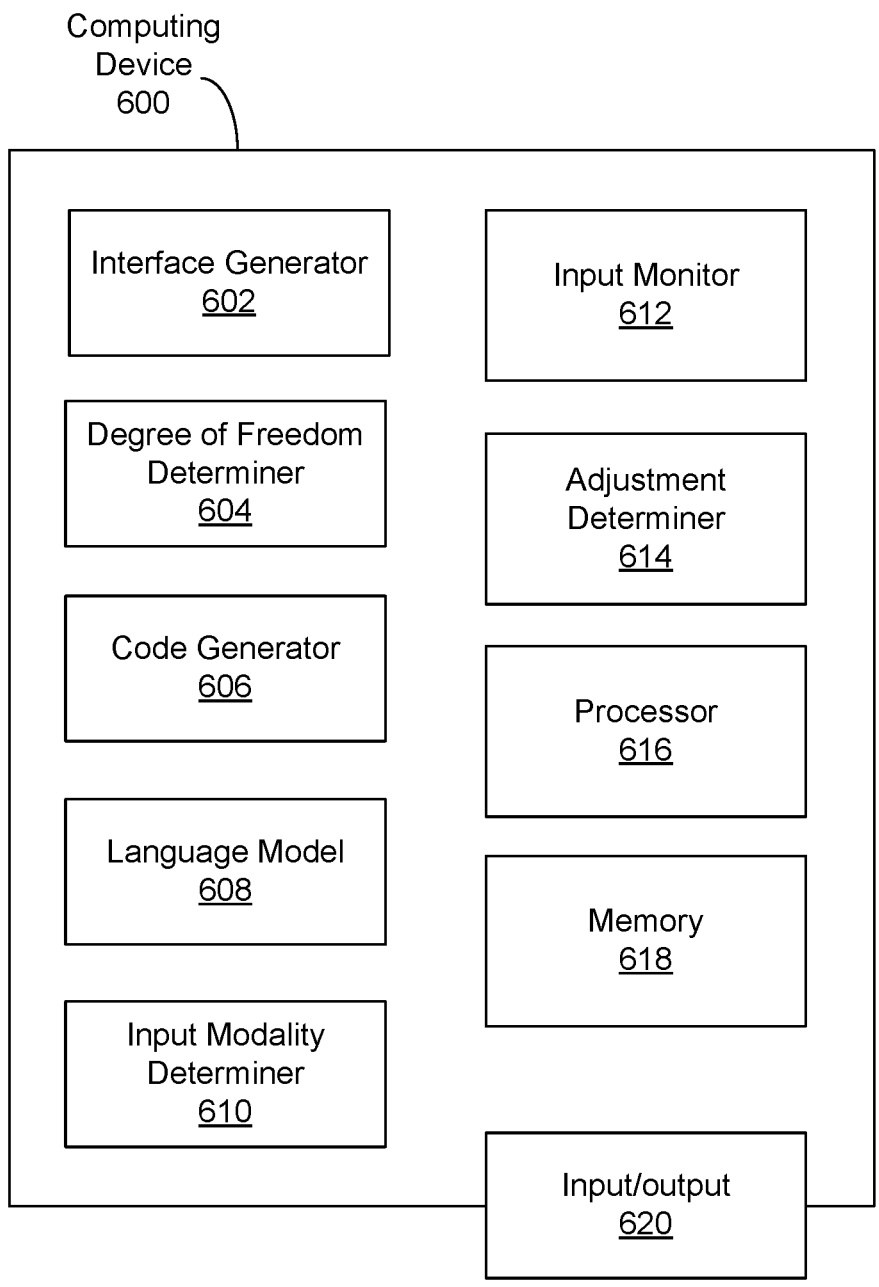
FIG. 6 is a block diagram of a computing device.

FIG. 6 is a block diagram of a computing device 600. The computing device 600 can represent the head-mounted device 104, a computing system in communication with the head-mounted device 104, and/or a distributed system that includes functionalities of the head-mounted device 104 and computing system in communication with the head-mounted device 104.

The computing device 600 can include an interface generator 602. The interface generator 602 can generate interfaces for receiving input from the user 102 within the XR environment. The interface generator 602 can generate, for example, icons for selection such as the icon 212, swipe interfaces that can receive the swipe 244, pinch interfaces that can receive the pinch 254, and/or a virtual keyboard such as the virtual keyboard 264.

In some examples, the interface generator 602 can generate a transparent or pop-up input modality of the head-mounted device 104 on top of or next to the corresponding input modality of the handheld device 108. The input modality of the head-mounted device 104 may be easier for the user 102 to interact with, and locating the input modality of the head-mounted device 104 on top of or next to the corresponding input modality of the handheld device 108 may clarify to the user 102 the purpose of the input modality of the head-mounted device 104. The interface generator 602 can generate a hover state for the head-mounted device 104 that allows the user 102 to confirm accurate selection (or "aiming") before selecting the input modality of the head-mounted device 104.

In some examples, a coarse hand motion and/or controller motion implemented by the interface generator 602 causes a cursor implemented by the interface generator 602 to snap and/or jump between interactable elements of the interface that receives input from the interface generator 602. In some examples, the interface generator 602 processes input from the touchscreen display 114 to enable the user 102 to interact with the touchscreen display 114 like a trackpad to move a cursor implemented by the interface generator 602 within the XR environment. In some examples, the interface generator 602 processes gestures by the user 102 to move a cursor implemented by the interface generator 602 without snapping (or moving discontinuously) between interface elements. In some examples, the interface generator 602 enables the user 102 to change and/or scale a window size of an interface element and/or change or scale a ratio of input motion (from the user 102) to output response. In some examples, the interface generator 602 mirrors the touchscreen display 114 for seamless touchscreen interaction while generating a second, larger screen that is anchored to the handheld device 108 or otherwise placed in three-dimensional space for improved legibility. The user 102 can interact with (and provide input to) either the touchscreen display 114 or the second, larger screen.

The computing device 600 can include a degree of freedom determiner 604. The degree of freedom determiner 604 can determine a number of degrees of freedom of the input modality of the handheld device 108. In some examples, the degree of freedom determiner 604 determines the number of degrees of freedom of the input modality of the handheld device 108 based on receiving an identifier of the input modality of the handheld device 108 and mapping the identifier of the input modality of the handheld device 108 to the number of degrees of freedom within an input modality-to-degrees of freedom database. In some examples, the degree of freedom determiner 604 determines the number of degrees of freedom of the input modality of the handheld device 108 based on one or more images of the touchscreen display 114 of the handheld device 108. In some examples, the degree of freedom determiner 604 determines the number of degrees of freedom of the input modality of the handheld device 108 by generating, based on one or more images of the touchscreen display 114 of the handheld device 108, computer-executable code that would implement the input modality of the handheld device 108. In some examples, the degree of freedom determiner 604 can determine the number of degrees of freedom by generating a textual description of the input modality of the handheld device 108. The textual description of the input modality of the handheld device 108 can be generated based on the computer-executable code that would implement the input modality of the handheld device 108, and/or based on the one or more images of the touchscreen display 114 of the handheld device 108.

In some examples, the degree of freedom determiner 604 determines a number of degrees of freedom of the input modality of the handheld device 108 based on options for touchscreen input and/or available selections. The degree of freedom determiner 604 can, for example, determine that the input modality of the handheld device 108 has a single degree of freedom based on a photo gallery allowing swipes in a single dimension (e.g. either left/right or up/down), two degrees of freedom based on the photos allowing pinch out to zoom, one degree of freedom based on multiple text links allowing selection by clicking, one degree of freedom based on scrollable text that allows for easy scrolling, or zero degrees of freedom for each of multiple button icons (such as dots, menus, or arrows) that can easily be selected by clicking.

The computing device 600 can include a code generator 606. The code generator 606 can generate the computer-executable code that would implement the input modality of the handheld device 108 based on the one or more images of the touchscreen display 114 of the handheld device 108 captured by one or more cameras included in the head-mounted device 104. The computer-executable code can be in any programing language that implements user interfaces. An example of computer-executable code for implementing a sliding gesture is shown in FIG. 4.

The computing device 600 can include a language model 608. The language model 608 can include a probabilistic model of natural language, such as a large language model. The language model 608 can, for example, include a combination of large datasets of words, neural networks, and/or transformers that generate text in response to prompts. The prompts can include a request for a description of the computer-executable code that would implement the input modality of the handheld device 108, and/or a request for a description of the input modality within the one or more images of the touchscreen display 114 of the handheld device 108.

The language model can generate the textual description of the input modality of the handheld device 108. The language model 608 can generate the textual description of the input modality of the handheld device 108 based on the computer-executable code that would implement the input modality of the handheld device 108, and/or based on the one or more images of the touchscreen display 114 of the handheld device 108 captured by the head-mounted device 104.

The computing device 600 can include an input modality determiner 610. The input modality determiner 610 can determine an input modality for the head-mounted device 104 that corresponds to the input modality of the handheld device 108. The input modality determiner 610 can determine an input modality for the head-mounted device 104 that corresponds to the input modality of the handheld device 108 based on one or more images of the touchscreen display 114 of the handheld device 108 that include the input modality of the handheld device 108, the number of degrees of freedom of the input modality of the handheld device 108, the computer-executable code that would implement the input modality of the handheld device 108, and/or the textual description of the input modality of the handheld device 108. In some examples, the input modality determiner 610 selects an input modality of the head-mounted device 104 that has a same number of degrees of freedom as the input modality of the handheld device 108.

The computing device 600 can include an input monitor 612. The input monitor 612 can monitor input by the user 102 into the handheld device 108. The input monitor 612 can, for example, determine times and/or locations of contact by a hand 110, 112 of the user 102 onto a touchscreen display 114 of the handheld device 108. The input monitor 612 can determine times and/or locations of contact by a hand 110, 112 of the user 102 onto a touchscreen display 114 of the handheld device 108 based on data received from the handheld device 108, such as timing and/or location data received via a wireless channel between the handheld device 108 and the head-mounted device 104.

The computing device 600 can include an adjustment determiner 614. The adjustment determiner 614 can determine an adjustment for representations of the user 102 providing input within the XR environment. The adjustment determiner 614 can compare times and/or locations of input by the user 102 to the handheld device 108 to times and/or locations at which the user 102 is represented as contacting an input modality of the head-mounted device 104 within the XR environment. The adjustment determiner 614 can determine discrepancies and/or differences between the times and/or locations of input by the user 102 and the times and/or locations at which the user 102 is represented as contacting and/or interacting with an input modality of the head-mounted device 104 within the XR environment. The adjustment determiner 614 can determine an adjustment based on the discrepancies and/or differences between the times and/or locations of input by the user 102 and the times and/or locations at which the user 102 is represented as contacting an input modality of the head-mounted device 104 within the XR environment. The computing device 600 can adjust the representation of the input modality of the head-mounted device 104, such as the hand(s) 130, 132 and the handheld device image 138, based on the adjustment, so that the representation of the hands 130, 132 providing input to the handheld device image 138 more accurately corresponds to the actual timing and location of the hands 110, 112 contacting the handheld device 108.

The computing device 600 can include at least one processor 616. The at least one processor 616 can execute instructions, such as instructions stored in at least one memory device 618, to cause the computing device 600 to perform any combination of methods, functions, and/or techniques described herein.

The computing device 600 can include at least one memory device 618. The at least one memory device 618 can include a non-transitory computer-readable storage medium. The at least one memory device 618 can store data and instructions thereon that, when executed by at least one processor, such as the processor 616, are configured to cause the computing device 600 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the computing device 600 can be configured to perform, alone, or in combination with another computing device such a server in communication with the computing device 600 and/or the handheld device 108, any combination of methods, functions, and/or techniques described herein.

The computing device 600 may include at least one input/output node 620. The at least one input/output node 620 may receive and/or send data, such as from and/or to, another computer, and/or may receive input and provide output from and to a user such as the user 102. The input and output functions may be combined into a single node, or may be divided into separate input and output nodes. The input/output node 620 can include, for example, a camera, an inertial measurement unit (IMU), a display, a speaker, a microphone, one or more buttons, and/or one or more wired or wireless interfaces for communicating with other computing devices.

Figure 7A:
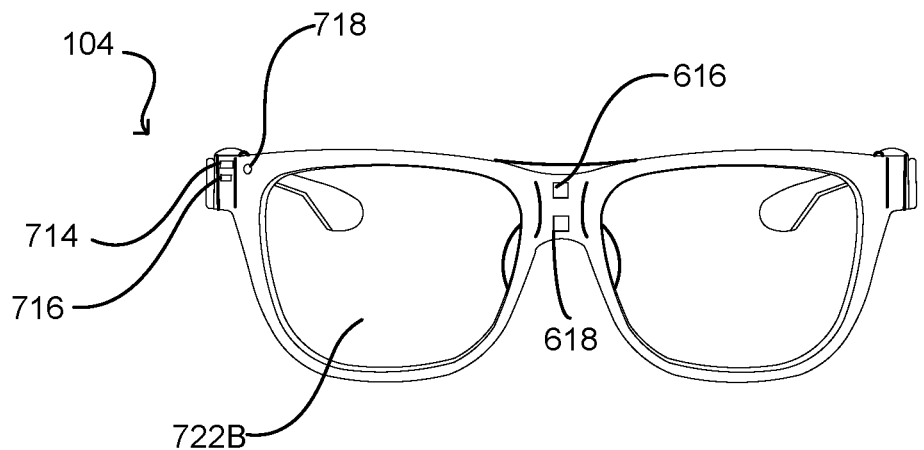
FIGS. 7A, 7B, and 7C show an example of a head-mounted device.
Figure 7B:
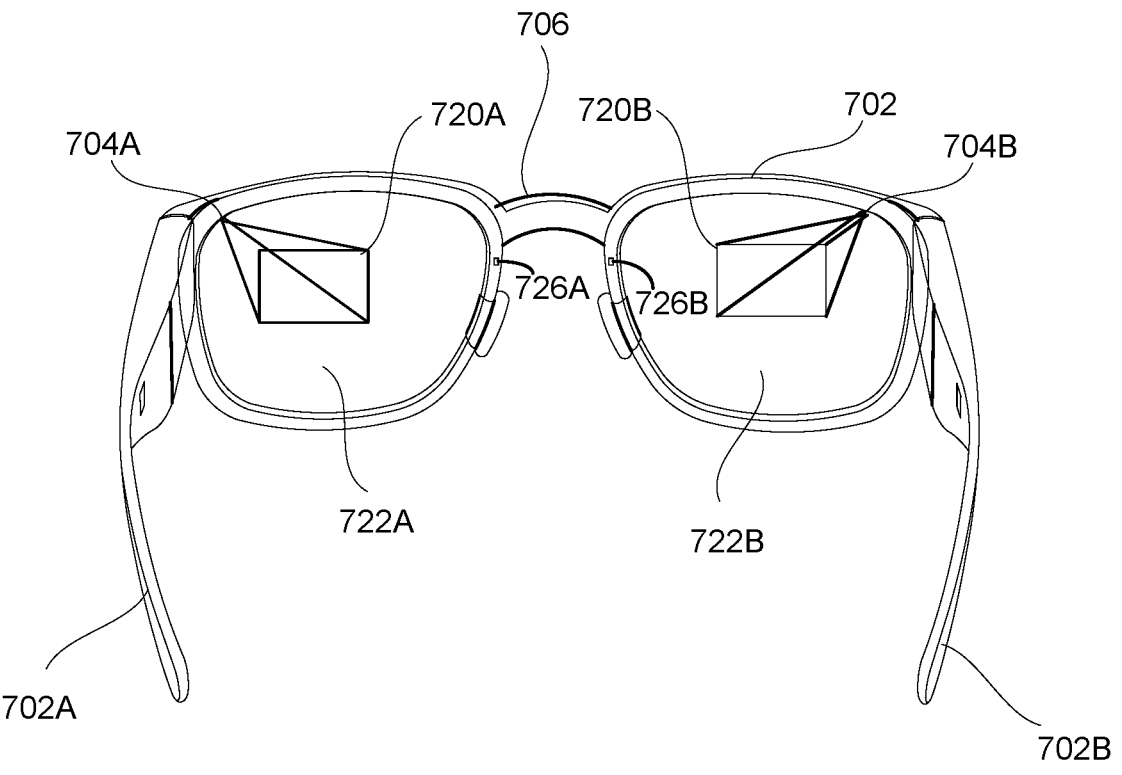
Figure 7C:
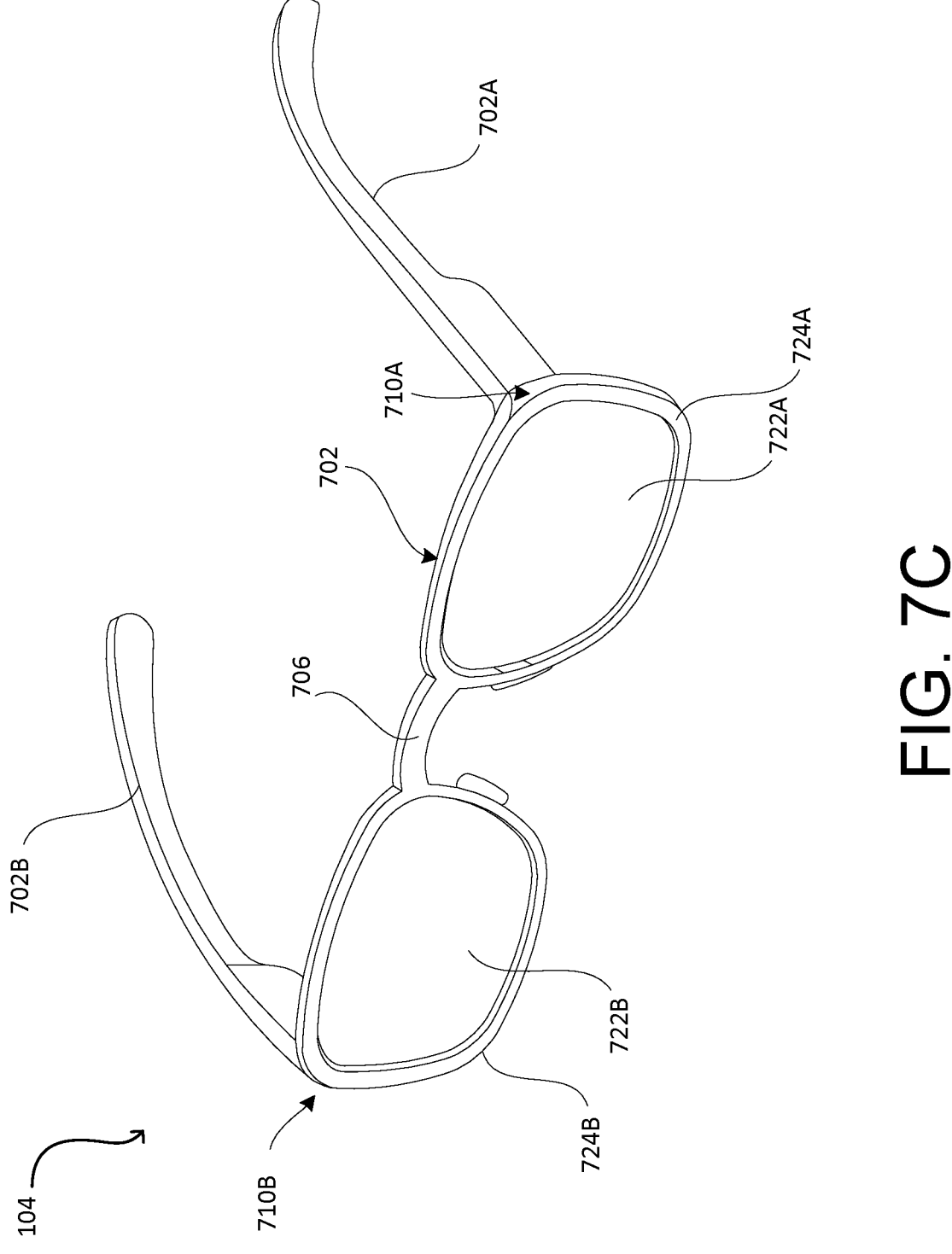

FIGS. 7A, 7B, and 7C show an example of a head-mounted device 104. FIGS. 7A, 7B, and 7C show an example of the head-mounted device 104. As shown in FIGS. 7A, 7B, and 7C, the example head-mounted device 104 includes a frame 702. The frame 702 includes a front frame portion defined by rim portions 724A, 724B surrounding respective optical portions in the form of lenses 722A, 722B, with a bridge portion 706 connecting the rim portions 724A, 724B. Arm portions 702A, 702B included in frame 702 are coupled, for example, pivotably or rotatably coupled, to the front frame by hinge portions 710A, 710B at the respective rim portions 724A, 724B. In some examples, the lenses 722A, 722B may be corrective/prescription lenses. In some examples, the lenses 722A, 722B may be an optical material including glass and/or plastic portions that do not necessarily incorporate corrective/prescription parameters. Displays 704A, 704B may be coupled in a portion of the frame 702. In the example shown in FIG. 7B, the displays 704A, 704B are coupled in the arm portions 702A, 702B and/or rim portions 724A, 724B of the frame 702. In some examples, the head-mounted device 104 can also include an audio output device 716 (such as, for example, one or more speakers), an illumination device 718, at least one processor 616, at least one memory device 618, an outward-facing image sensor 714 (or camera), and/or gaze-tracking cameras 726A, 726B that can capture images of eyes of the user 102 to track a gaze of the user 102. The at least one processor 616 can execute instructions. The at least one memory device 618 can include a non-transitory computer-readable storage medium comprising instructions stored thereon that, when executed by the at least one processor 616, are configured to cause the head-mounted device 104 to perform any combination of methods, functions, and/or techniques described herein.

In some examples, the head-mounted device 104 may include a see-through near-eye display. For example, the displays 704A, 704B may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 722A, 722B, next to content (for example, digital images, user interface elements, virtual content, and/or virtual objects) generated by the displays 704A, 704B. In some implementations, waveguide optics may be used to depict content on and/or by the displays 704A, 704B via outcoupled light. The images 720A, 720B projected by the displays 704A, 704B onto the lenses 722A, 722B may be translucent, allowing the user 102 to see the images projected by the displays 704A, 704B as well as physical objects beyond the head-mounted device 104.

In the example shown in FIG. 7C, the head-mounted device 104 includes lenses 722A, 722B supported by the frame 702. The lenses 722A, 722B can be supported by respective rim portions 724A, 724B that are included in the frame 702. In some examples, the lenses 722A, 722B, in conjunction with the displays 704A, 704B, present, to the user 102, images generated by the processor 616. The rim portion 724A can be coupled to rim portion 724B via the bridge portion 706.

Figure 8:
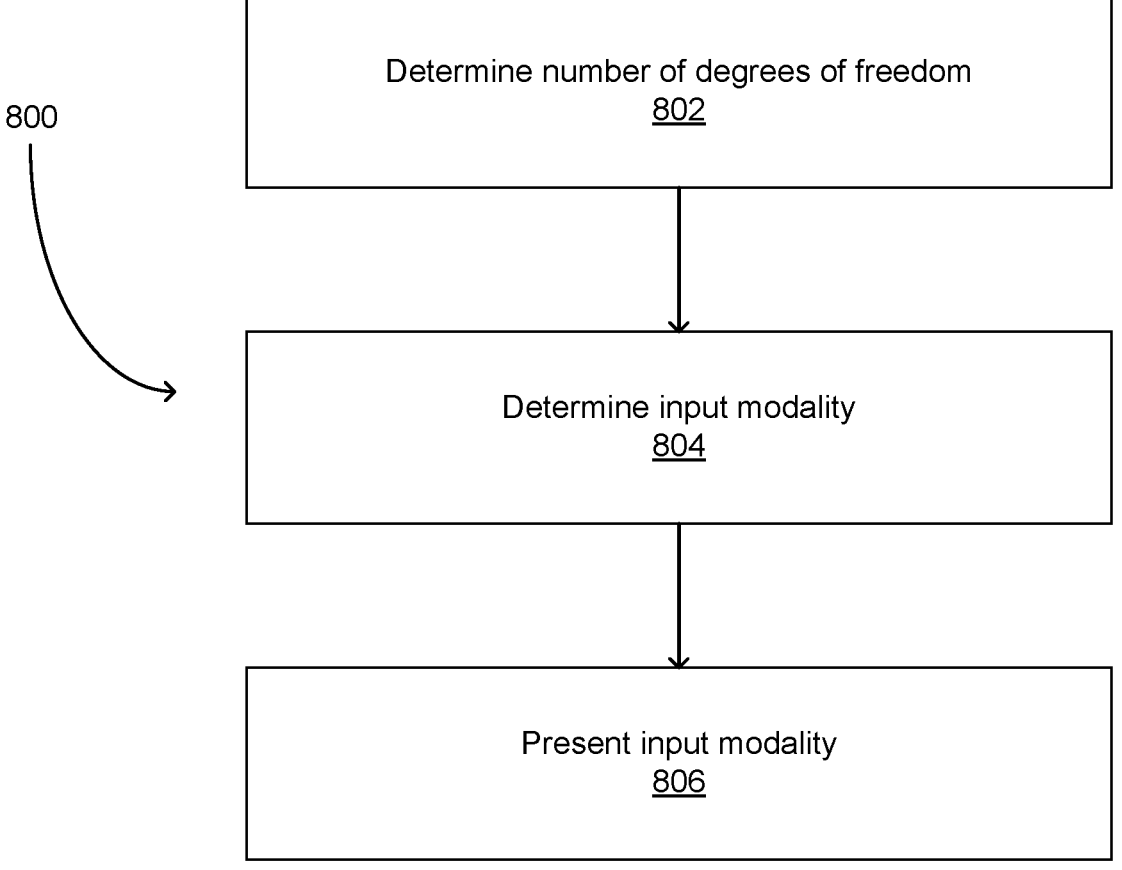
FIG. 8 is a flowchart of a method performed by a computing device.

FIG. 8 is a flowchart of a method 800 performed by a computing device. The computing device performing the method 800 can include any combination of the head-mounted device 104, an auxiliary device such as the handheld device 108, a server or other computing device in communication with the head-mounted device and/or auxiliary device, and/or the computing device 600.

The method 800 can include determining a number of degrees of freedom (802). Determining the number of degrees of freedom (802) can include determining, by a head-mounted device mounted on a head of a user, a number of degrees of freedom of an input modality of an auxiliary device. The method 800 can include determining an input modality (804). Determining the input modality (804) can include determining an input modality of the head-mounted device based on the number of degrees of freedom of the input modality of the auxiliary device. The method 800 can include presenting the input modality (806). Presenting the input modality (806) can include presenting the input modality of the head-mounted device to the user.

In some examples, determining the number of degrees of freedom of the input modality includes generating computer-executable code based on at least one image of the input modality of the auxiliary device, the computer-executable code being configured to generate the input modality of the auxiliary device; and determining the number of degrees of freedom of the input modality of the auxiliary device based on the computer-executable code.

In some examples, the auxiliary device includes a handheld device.

In some examples, determining the number of degrees of freedom of the input modality includes generating computer-executable code based on at least one image of the input modality of the auxiliary device, the computer-executable code being configured to generate the input modality of the auxiliary device; determining, by a language model, a classification of the input modality of the auxiliary device based on the computer-executable code; and determining the number of degrees of freedom of the input modality of the auxiliary device based on the classification.

In some examples, the input modality of the head-mounted device has a same number of degrees of freedom as the input modality of the auxiliary device.

In some examples, the input modality of the auxiliary device includes a selection of a button presented by a display included in the auxiliary device, and the input modality of the head-mounted device includes a selection of an icon presented by the head-mounted device.

In some examples, the input modality of the auxiliary device includes a swipe on a display included in the auxiliary device, and the input modality of the head-mounted device includes the head-mounted device capturing a gesture of a hand of the user.

In some examples, the input modality of the auxiliary device includes typing onto a soft keyboard presented by a touchscreen display included in the auxiliary device, and the input modality of the head-mounted device includes the head-mounted device capturing typing of a hand of the user onto a virtual keyboard presented by the head-mounted device.

In some examples, the method 800 further comprises processing input via the input modality of the head-mounted device to generate an instruction, and sending the instruction to the auxiliary device.

Figure 9:
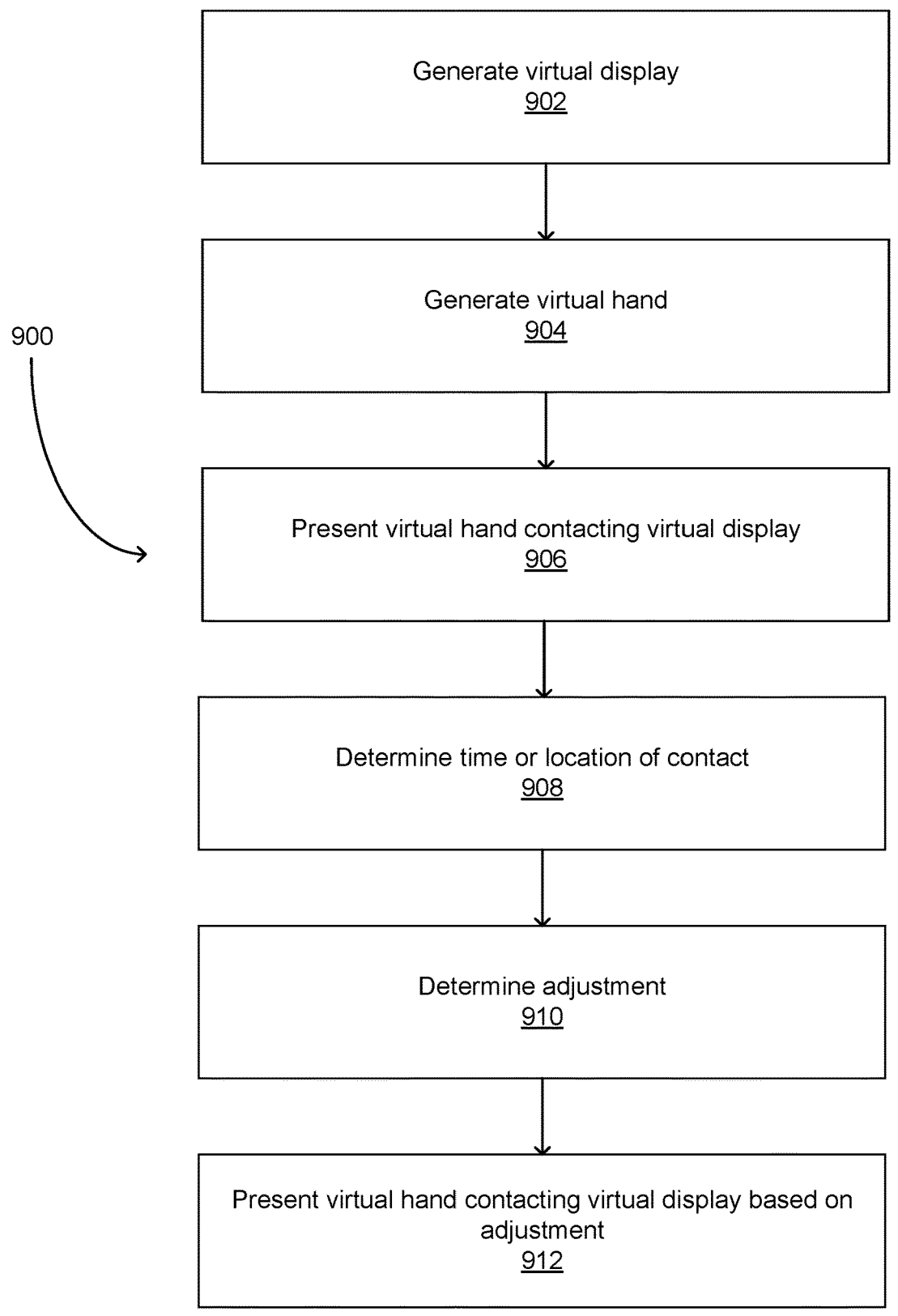
FIG. 9 is a flowchart of a method performed by a computing device.

FIG. 9 is a flowchart of a method 900 performed by a computing device. The computing device performing the method 900 can include any combination of the head-mounted device 104, an auxiliary device such as the hand-held device 108, a server or other computing device in communication with the head-mounted device and/or auxiliary device, and/or the computing device 600.

The method 900 can include generating a virtual display (902). Generating the virtual display (902) can include generating, by a head-mounted device within an extended Reality (XR) environment, the virtual display. The virtual display can be based on a touchscreen display presented by an auxiliary device held by a user who is wearing the head-mounted device. The method 900 can include generating a virtual hand (904). Generating the virtual hand (904) can include generating, within the XR environment, the virtual hand based on first image data captured by a camera. The camera can be included in the head-mounted device. The method 900 can include presenting the virtual hand contacting the virtual display (906). Presenting the virtual hand contacting the virtual display (906) can include, presenting, within the XR environment, the virtual hand contacting the virtual display based on second image data captured by the camera. The method 900 can include determining a location or time of contact (908). Determining the location or time of contact (908) can include determining at least one of a time or location of contact by a hand of the user onto the touchscreen display based on a signal received from the auxiliary device. The method 900 can include determining an adjustment (910). Determining the adjustment (910) can include determining the adjustment based on the at least one of the time or location of the contact and the presentation of the virtual hand contacting the virtual display. The method 900 can include presenting the virtual hand contacting the virtual display based on the adjustment (912). Presenting the virtual hand contacting the virtual display based on the adjustment (912) can include presenting, within the XR environment, the virtual hand contacting the virtual display based on third image data captured by the camera and the adjustment.

In some examples, the virtual display streams content presented by the touchscreen display.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
capturing, by a head-worn device worn on a head of a user, at least one image of an input modality of a handheld device held by the user;
determining, based on the at least one image, a number of degrees of freedom of the input modality;
generating an input modality of the head-worn device based on the number of degrees of freedom of the input modality of the handheld device, the input modality of the head-worn device including at least one user interface element corresponding to at least one element of the input modality of the handheld device; and
presenting the input modality of the head-worn device to the user.

2. The method of claim 1, wherein determining the number of degrees of freedom of the input modality includes:
generating computer-executable code based on at least one image of the input modality of the handheld device, the computer-executable code being configured to generate the input modality of the handheld device; and
determining the number of degrees of freedom of the input modality of the handheld device based on the computer-executable code.

3. The method of claim 1, further comprising recreating a physical environment based on the at least one image, the physical environment including the handheld device.

4. The method of claim 1, wherein determining the number of degrees of freedom of the input modality includes:
generating computer-executable code based on at least one image of the input modality of the handheld device, the computer-executable code being configured to generate the input modality of the handheld device;
determining, by a language model, a classification of the input modality of the handheld device based on the computer-executable code; and
determining the number of degrees of freedom of the input modality of the handheld device based on the classification.

5. The method of claim 1, wherein the input modality of the head-worn device has a same number of degrees of freedom as the input modality of the handheld device.

6. The method of claim 1, wherein:
the input modality of the handheld device includes a selection of a button presented by a display included in the handheld device; and
the input modality of the head-worn device includes a selection of an icon presented by the head-worn device.

7. The method of claim 1, wherein:
the input modality of the handheld device includes a swipe on a display included in the handheld device; and the input modality of the head-worn device includes the head-worn device capturing a gesture of a hand of the user.

8. The method of claim 1, wherein:
the input modality of the handheld device includes typing onto a soft keyboard presented by a touchscreen display included in the handheld device; and
the input modality of the head-worn device includes the head-worn device capturing typing of a hand of the user onto a virtual keyboard presented by the head-worn device.

9. The method of claim 1, further comprising:
processing input via the input modality of the head-worn device to generate an instruction; and
sending the instruction to the handheld device.

10. A non-transitory computer-readable storage medium comprising instructions stored thereon that, when executed by at least one processor, are configured to cause a computing device to:
capture, by a head-worn device worn on a head of a user, at least one image of an input modality of a handheld device held by the user;
determine, based on the at least one image, a number of degrees of freedom of an input modality of the handheld device;
generate an input modality of the head-worn device based on the number of degrees of freedom of the input modality of the handheld device, the input modality of the head-worn device including at least one user interface element corresponding to at least one element of the input modality of the handheld device; and
present the input modality of the head-worn device to the user.

11. The non-transitory computer-readable storage medium of claim 10, wherein determining the number of degrees of freedom of the input modality includes:
generating computer-executable code based on at least one image of the input modality of the handheld device, the computer-executable code being configured to generate the input modality of the handheld device; and
determining the number of degrees of freedom of the input modality of the handheld device based on the computer-executable code.

12. The non-transitory computer-readable storage medium of claim 10, wherein the instructions are further configured to cause the computing device to recreate a physical environment based on the at least one image, the physical environment including the handheld device.

13. The non-transitory computer-readable storage medium of claim 10, wherein determining the number of degrees of freedom of the input modality includes:
generating computer-executable code based on at least one image of the input modality of the handheld device, the computer-executable code being configured to generate the input modality of the handheld device;
determining, by a language model, a classification of the input modality of the handheld device based on the computer-executable code; and
determining the number of degrees of freedom of the input modality of the handheld device based on the classification.

14. The non-transitory computer-readable storage medium of claim 10, wherein the input modality of the head-worn device has a same number of degrees of freedom as the input modality of the handheld device.

15. The non-transitory computer-readable storage medium of claim 10, wherein:

the input modality of the handheld device includes a selection of a button presented by a display included in the handheld device; and the input modality of the head-worn device includes a selection of an icon presented by the head-worn device.

16. The non-transitory computer-readable storage medium of claim 10, wherein:

the input modality of the handheld device includes a swipe on a display included in the handheld device; and the input modality of the head-worn device includes the head-worn device capturing a gesture of a hand of the user.

17. The non-transitory computer-readable storage medium of claim 10, wherein:

the input modality of the handheld device includes typing onto a soft keyboard presented by a touchscreen display included in the handheld device; and the input modality of the head-worn device includes the head-worn device capturing typing of a hand of the user onto a virtual keyboard presented by the head-worn device.

18. The non-transitory computer-readable storage medium of claim 10, wherein the instructions are further configured to cause the computing device to:

process input via the input modality of the head-worn device to generate an instruction; and send the instruction to the handheld device.

19. A method comprising:

capturing, by a head-worn device worn on a head of a user, at least one image of a touchscreen display presented by a handheld device held by the user, the at least one image being captured by a camera included in the head-worn device;

generating, within an extended Reality (XR) environment, a virtual display, the virtual display being based on the touchscreen display;

generating, within the XR environment, a virtual hand based on first image data captured by the camera;

presenting, within the XR environment, the virtual hand contacting the virtual display based on second image data captured by the camera;

determining at least one of a time or location of contact by a hand of the user onto the touchscreen display based on a signal received from the handheld device;

determining an adjustment based on the at least one of the time or location of the contact and the presentation of the virtual hand contacting the virtual display; and presenting, within the XR environment, the virtual hand contacting the virtual display based on third image data captured by the camera and the adjustment.

20. The method of claim 19, wherein the virtual display streams content presented by the touchscreen display.

* * * * *